(12) United States Patent
Gadre

(10) Patent No.: US 12,548,481 B2
(45) Date of Patent: Feb. 10, 2026

(54) VIRTUAL REALITY AND AUGMENTED REALITY DISPLAY SYSTEM FOR NEAR-EYE DISPLAY DEVICES

(71) Applicant: Meta Platforms Technologies, LLC, Menlo Park, CA (US)

(72) Inventor: Aditya Gadre, Vancouver (CA)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/503,740

(22) Filed: Nov. 7, 2023

(65) Prior Publication Data
US 2024/0282225 A1 Aug. 22, 2024

Related U.S. Application Data

(60) Provisional application No. 63/446,598, filed on Feb. 17, 2023.

(51) Int. Cl.
*G09G 3/00* (2006.01)
*G06F 3/01* (2006.01)
*G06T 11/00* (2006.01)

(52) U.S. Cl.
CPC .............. *G09G 3/003* (2013.01); *G06F 3/012* (2013.01); *G06F 3/013* (2013.01); *G06F 3/017* (2013.01);
(Continued)

(58) Field of Classification Search
CPC ........ G09G 3/003; G09G 3/012; G09G 3/013; G09G 3/017; G09G 2354/00; G09G 2360/122; G06T 11/001
See application file for complete search history.

(56) References Cited

U.S. PATENT DOCUMENTS 5,886,706 A * 3/1999 Alcorn .................... G06T 15/04
345/506
8,819,705 B2 * 8/2014 Reeves ................. G06F 3/1431
719/318
(Continued)

OTHER PUBLICATIONS

European Search Report for European Patent Application No. 24155140.7, dated Jun. 28, 2024, 7 pages.
(Continued)

*Primary Examiner* — Gene W Lee
(74) *Attorney, Agent, or Firm* — Morgan, Lewis & Bockius LLP

(57) ABSTRACT

A system for implementing an augmented reality (AR)/virtual reality (VR) display includes a hardware (HW) architecture that employs a system-on-chip (SoC) to compose and submit textures. The SoC composes and submits textures by using display serial interface (DSI) display lines to transmit the textures to a physical display. Software (SW) architecture includes a stack display architecture with an applications level using the surface rendered by applications, a display service level to compose superframes, provide an abstraction layer on top of a surface flinger (SL) application programming interface (API), and allow assignment of textures and metadata to different hardware planes, and a driver level. The system uses the surfaces or enhanced effects that are rendered by the applications or the compositor, depending on the type of the application, and computes the metadata related to the location or coordinates.

20 Claims, 8 Drawing Sheets

(52) U.S. Cl.
CPC ........ *G06T 11/001* (2013.01); *G09G 2354/00* (2013.01); *G09G 2360/122* (2013.01)

(56) References Cited

U.S. PATENT DOCUMENTS

| | | | | |
|---|---|---|---|---|
| 8,933,949 | B2* | 1/2015 | Reeves | G06F 3/1431 |
| | | | | 345/522 |
| 9,693,049 | B2* | 6/2017 | Priede | G06T 19/006 |
| 9,733,699 | B2* | 8/2017 | Stark | G09G 3/003 |
| 9,740,005 | B2 | 8/2017 | Bean et al. | |
| 10,026,212 | B2* | 7/2018 | Donner | H04N 13/376 |
| 10,586,397 | B1 | 3/2020 | Ha et al. | |
| 10,713,831 | B2 | 7/2020 | Arana et al. | |
| 10,762,697 | B1* | 9/2020 | Anderegg | G06T 17/00 |
| 11,145,107 | B2* | 10/2021 | Greene | H04N 21/42692 |
| 11,175,734 | B1* | 11/2021 | Hossain | G06F 3/014 |
| 11,196,964 | B2* | 12/2021 | Yerli | G06F 16/2379 |
| 11,284,646 | B2* | 3/2022 | Janardhan | A24F 40/65 |
| 11,430,141 | B2* | 8/2022 | Tamama | G06T 15/04 |
| 11,615,576 | B2* | 3/2023 | Greene | G09G 5/024 |
| | | | | 345/503 |
| 11,759,712 | B2* | 9/2023 | Withey | A63F 13/53 |
| | | | | 463/31 |
| 11,915,377 | B1* | 2/2024 | Bhushan | H04L 67/131 |
| 12,112,435 | B1* | 10/2024 | Bhushan | H04N 7/157 |
| 2008/0284798 | A1* | 11/2008 | Weybrew | G06T 15/503 |
| | | | | 345/629 |
| 2011/0254852 | A1* | 10/2011 | Howson | G06T 15/04 |
| | | | | 345/582 |
| 2015/0363976 | A1* | 12/2015 | Henson | H04N 13/279 |
| | | | | 345/419 |
| 2016/0192302 | A1* | 6/2016 | Bar Bracha | H04L 1/205 |
| | | | | 370/350 |
| 2019/0385342 | A1 | 12/2019 | Freeman et al. | |
| 2020/0368616 | A1* | 11/2020 | Delamont | H04N 13/239 |
| 2021/0165229 | A1* | 6/2021 | Stahl | G06F 3/04815 |
| 2022/0044468 | A1 | 2/2022 | Greene et al. | |
| 2023/0298250 | A1* | 9/2023 | Luo | H04N 13/128 |
| | | | | 345/582 |

OTHER PUBLICATIONS

Kooima R.L., et al., "A GPU Sub-Pixel Algorithm for Autostereoscopic Virtual Reality," 2007 IEEE Virtual Reality Conference, Mar. 10, 2007, pp. 131-137.

Smit F.A., et al., "A Programmable Display Layer for Virtual Reality System Architectures," IEEE Transactions on Visualization and Computer Graphics, Jan. 2010, vol. 16, No. 01, pp. 28-42.

Office Action mailed Nov. 26, 2025 for European Patent Application No. 24155140.7, filed on Jan. 31, 2024, 7 pages.

* cited by examiner

VIRTUAL REALITY AND AUGMENTED REALITY DISPLAY SYSTEM FOR NEAR-EYE DISPLAY DEVICES

CROSS REFERENCE TO RELATED APPLICATIONS

This patent application claims priority to U.S. Provisional Patent Application No. 63/446,598, entitled "VIRTUAL REALITY AND AUGMENTED REALITY DISPLAY SYSTEM FOR NEAR-EYE DISPLAY DEVICES," filed on Feb. 17, 2023.

TECHNICAL FIELD

This patent application relates generally to near-eye display devices, and in particular, to an architecture for displaying virtual reality (VR)/augmented reality (AR) content on near-eye display devices.

BACKGROUND

With recent advances in technology, prevalence and proliferation of content creation and delivery has increased greatly in recent years. In particular, interactive content such as virtual reality (VR) content, augmented reality (AR) content, mixed reality (MR) content, and content within and associated with a real and/or virtual environment (e.g., a "metaverse") has become appealing to consumers.

To facilitate delivery of this and other related content, service providers have endeavored to provide various forms of wearable display systems. One such example may be a head-mounted display (HMD) device, such as a wearable eyewear, a wearable headset, or eyeglasses. In some examples, the head-mounted display (HMD) device may project or direct light to may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

DETAILED DESCRIPTION

Figure 1:
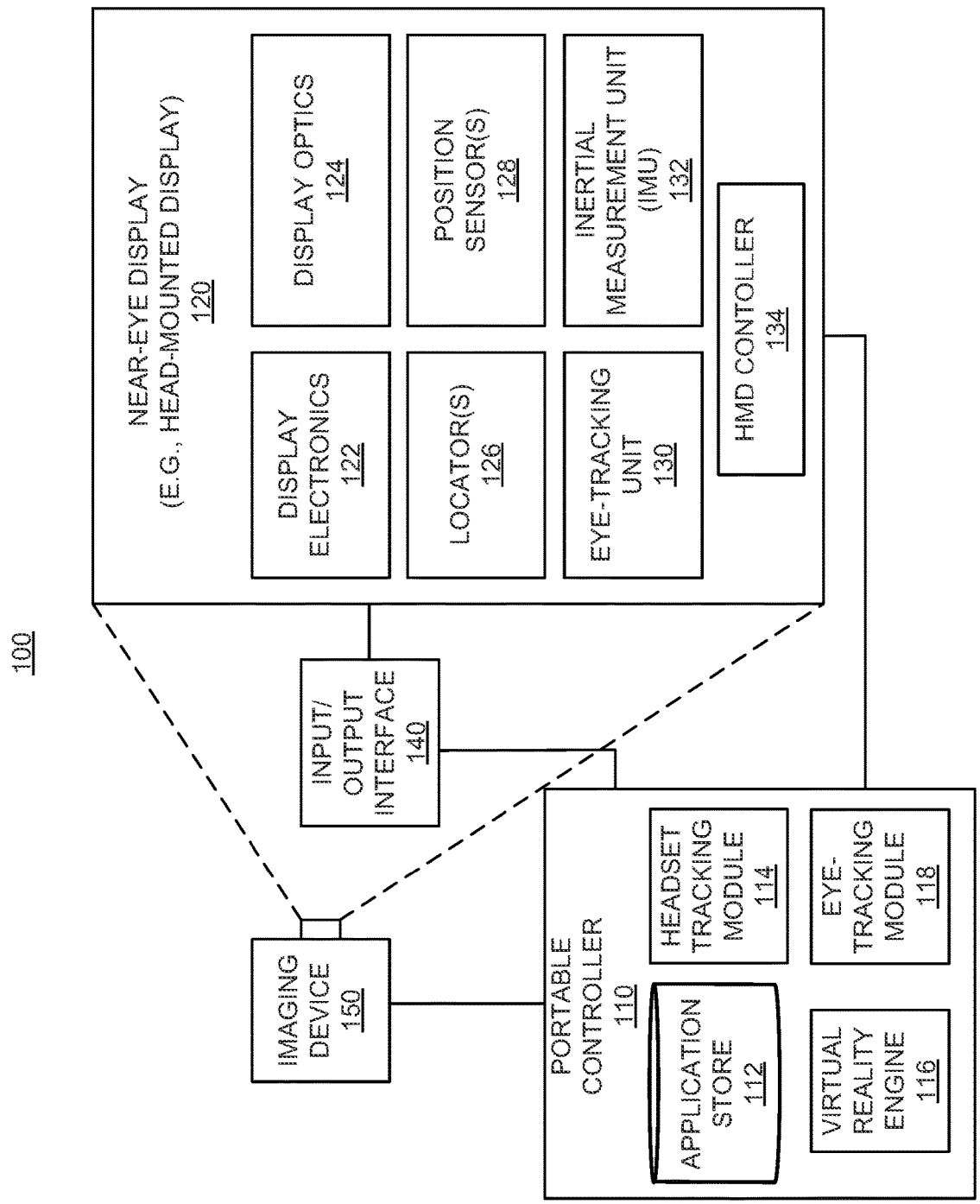
FIG. 1 illustrates a block diagram of an artificial reality system environment including a near-eye display, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

Conventional displays (including augmented reality (AR)/virtual reality (VR) displays) integrate and coordinate objects from a number of applications on a display surface. In typical displays, the position and movement of objects is independent of user, that is, user's head position and/or gaze. In a near-eye display device, objects may need to be moved or kept stationary depending on the movement (e.g., rotation) of the user's head or change in user's gaze direction, which is not provided by conventional displays. Furthermore, image processing, that is integration of the objects and their display may be processed in a single processor, which may present size, weight, and/or power consumption challenges to small form factor near-eye display devices.

In some examples of the present disclosure, a system for implementing an augmented reality (AR)/virtual reality (VR) display may include a hardware (HW) architecture that employs a system-on-chip (SoC) to compose and submit textures. The system-on-chip (SoC) may compose and submit textures by using display serial interface (DSI) display lines to transmit the textures to a physical display, for example. Software (SW) architecture may be a stack display architecture and include an applications level using the surface rendered by applications, a display service level to compose superframes, provide an abstraction layer on top of a surface flinger (SL) application programming interface (API), and allow assignment of textures and metadata to different hardware planes, and a driver level. The application level may include a user visible application that uses the graphical processing unit (GPU) or user interface (UI) for rendering its content (e.g., a frame or superframe). The system may use the surfaces or enhanced effects that are rendered by the applications or the compositor, depending on the type of the application, and compute the metadata related to the location or coordinates. The surface flinger (SL) level may allow for building surface queues and display configurations for presentation. The driver level may implement the display (e.g., a display processing unit (DPU) driver).

An "application" as used herein refers to a user visible application that may use a graphical processing unit (GPU) for rendering its content or use a combination of user interface (UI) components and rendered buffers. A "compositor" may be compositing various user interface (UI) components with rendered components of the application in certain use cases. The compositor may use the graphical processing unit (GPU) to render the composited buffers. In some examples, the compositor may also be a passthrough to allow buffers from independent applications being assigned to layers and handed off to an application programming interface (API). The application programming interface (API) may take the surfaces rendered by the applications or the compositor depending on the type of the application and compute the metadata to render the surfaces to respective world locked coordinates. A "superframe composer" may provide an abstraction layer on top of a surface flinger (SL) application programming interface (API) to allow for assignment of textures and metadata to different hardware planes and manage synchronization of surface queues. The superframe composer may also be responsible for providing feedback when the surfaces land on the glass. A "surface flinger (SL)" may be a framework level component that allows for building surface queues along with display configuration for presentation. A "hardware (HW) composer" may assign different surface layers to appropriate hardware (HW) channels and may be responsible for configuring the channels as per the requirements. In some cases, the hardware (HW) composer may be configured in a passthrough mode. A 'display hardware abstraction layer (HAL)" may allow the hardware (HW) composer to communicate with kernel display software (SW) components. An integrated driver may contain actual implementation of the display and display processing unit (DPU) driver. The display processing unit (DPU) may be the hardware (HW) display processing unit that combines multiple planes and metadata into a single superframe.

While some advantages and benefits of the present disclosure are apparent, other advantages and benefits may include enhanced augmented reality (AR)/virtual reality (VR) user experience by allowing objects in displayed content to behave depending on user head position/movement and/or gaze. Furthermore, the distribution of functionality between processors on a portable controller device and the near-eye display device may allow weight, size, and power consumption reduction for the near-eye display device.

FIG. 1 illustrates a block diagram of an artificial reality system environment 100 including a near-eye display, according to an example. As used herein, a "near-eye display" may refer to a device (e.g., an optical device) that may be in close proximity to a user's eye. As used herein, "artificial reality" may refer to aspects of, among other things, a "metaverse" or an environment of real and virtual elements and may include use of technologies associated with virtual reality (VR), augmented reality (AR), and/or mixed reality (MR). As used herein a "user" may refer to a user or wearer of a "near-eye display."

As shown in FIG. 1, the artificial reality system environment 100 may include a near-eye display 120, an optional external imaging device 150, and an optional input/output interface 140, each of which may be coupled to a portable controller device 110. The portable controller device 110 may be optional in some instances as the functions of the portable controller device 110 may be integrated into the near-eye display 120. In some examples, the near-eye display 120 may be a head-mounted display (HMD) that presents content to a user. In other examples, the portable controller device 110 may be a portable device, for example, a smartphone or a smartphone-like device which may receive data through wired or wireless means from one or more servers, process, and provide to a controller on the near-eye display device.

In some instances, for a near-eye display system, it may generally be desirable to expand an eye box, reduce display haze, improve image quality (e.g., resolution and contrast), reduce physical size, increase power efficiency, and increase or expand field of view (FOV). As used herein, "field of view" (FOV) may refer to an angular range of an image as seen by a user, which is typically measured in degrees as observed by one eye (for a monocular head-mounted display (HMD)) or both eyes (for binocular head-mounted displays (HMDs)). Also, as used herein, an "eye box" may be a two-dimensional box that may be positioned in front of the user's eye from which a displayed image from an image source may be viewed.

In some examples, in a near-eye display system, light from a surrounding environment may traverse a "see-through" region of a waveguide display (e.g., a transparent substrate) to reach a user's eyes. For example, in a near-eye display system, light of projected images may be coupled into a transparent substrate of a waveguide, propagate within the waveguide, and be coupled or directed out of the waveguide at one or more locations to replicate exit pupils and expand the eye box.

In some examples, the near-eye display 120 may include one or more rigid bodies, which may be rigidly or non-rigidly coupled to each other. In some examples, a rigid coupling between rigid bodies may cause the coupled rigid bodies to act as a single rigid entity, while in other examples, a non-rigid coupling between rigid bodies may allow the rigid bodies to move relative to each other.

In some examples, the near-eye display 120 may be implemented in any suitable form-factor, including a head-mounted display (HMD), a pair of glasses, or other similar wearable eyewear or device. Examples of the near-eye display 120 are further described below with respect to FIGS. 2 and 3. Additionally, in some examples, the functionality described herein may be used in a head-mounted display (HMD) or headset that may combine images of an environment external to the near-eye display 120 and artificial reality content (e.g., computer-generated images). Therefore, in some examples, the near-eye display 120 may augment images of a physical, real-world environment external to the near-eye display 120 with generated and/or overlaid digital content (e.g., images, video, sound, etc.) to present an augmented reality to a user.

In some examples, the near-eye display 120 may include any number of display electronics 122, display optics 124, and an eye tracking unit 130. In some examples, the near-eye display 120 may also include one or more locators 126, one or more position sensors 128, and an inertial measurement unit (IMU) 132. In some examples, the near-eye display 120 may omit any of the eye tracking unit 130, the one or more locators 126, the one or more position sensors 128, and the inertial measurement unit (IMU) 132, or may include additional elements.

In some examples, the display electronics 122 may display or facilitate the display of images to the user according to data received from, for example, the portable controller device 110. In some examples, the display electronics 122 may include one or more display panels. In some examples, the display electronics 122 may include any number of pixels to emit light of a predominant color such as red, green, blue, white, or yellow. In some examples, the display electronics 122 may display a three-dimensional (3D) image, e.g., using stereoscopic effects produced by two-dimensional panels, to create a subjective perception of image depth.

In some examples, the near-eye display 120 may include a projector (not shown), which may form an image in angular domain for direct observation by a viewer's eye through a pupil. The projector may employ a controllable light source (e.g., a laser source) and a micro-electromechanical system (MEMS) beam scanner to create a light field from, for example, a collimated light beam. In some examples, the same projector or a different projector may be used to project a fringe pattern on the eye, which may be captured by a camera and analyzed (e.g., by the eye tracking unit 130) to determine a position of the eye (the pupil), a gaze, etc.

In some examples, the display optics 124 may display image content optically (e.g., using optical waveguides and/or couplers) or magnify image light received from the display electronics 122, correct optical errors associated with the image light, and/or present the corrected image light to a user of the near-eye display 120. In some examples, the display optics 124 may include a single optical element or any number of combinations of various optical elements as well as mechanical couplings to maintain relative spacing and orientation of the optical elements in the combination. In some examples, one or more optical elements in the display optics 124 may have an optical coating, such as an anti-reflective coating, a reflective coating, a filtering coating, and/or a combination of different optical coatings.

In some examples, the display optics 124 may also be designed to correct one or more types of optical errors, such as two-dimensional optical errors, three-dimensional optical errors, or any combination thereof. Examples of two-dimensional errors may include barrel distortion, pincushion distortion, longitudinal chromatic aberration, and/or transverse chromatic aberration. Examples of three-dimensional errors may include spherical aberration, chromatic aberration field curvature, and astigmatism.

In some examples, the one or more locators 126 may be objects located in specific positions relative to one another and relative to a reference point on the near-eye display 120. In some examples, the portable controller device 110 may identify the one or more locators 126 in images captured by the optional external imaging device 150 to determine the artificial reality headset's position, orientation, or both. The one or more locators 126 may each be a light-emitting diode (LED), a corner cube reflector, a reflective marker, a type of light source that contrasts with an environment in which the near-eye display 120 operates, or any combination thereof.

In some examples, the external imaging device 150 may include one or more cameras, one or more video cameras, any other device capable of capturing images including the one or more locators 126, or any combination thereof. The optional external imaging device 150 may be configured to detect light emitted or reflected from the one or more locators 126 in a field of view of the optional external imaging device 150.

In some examples, the one or more position sensors 128 may generate one or more measurement signals in response to motion of the near-eye display 120. Examples of the one or more position sensors 128 may include any number of accelerometers, gyroscopes, magnetometers, and/or other motion-detecting or error-correcting sensors, or any combination thereof.

In some examples, the inertial measurement unit (IMU) 132 may be an electronic device that generates fast calibration data based on measurement signals received from the one or more position sensors 128. The one or more position sensors 128 may be located external to the inertial measurement unit (IMU) 132, internal to the inertial measurement unit (IMU) 132, or any combination thereof. Based on the one or more measurement signals from the one or more position sensors 128, the inertial measurement unit (IMU) 132 may generate fast calibration data indicating an estimated position of the near-eye display 120 that may be relative to an initial position of the near-eye display 120. For example, the inertial measurement unit (IMU) 132 may integrate measurement signals received from accelerometers over time to estimate a velocity vector and integrate the velocity vector over time to determine an estimated position of a reference point on the near-eye display 120. Alternatively, the inertial measurement unit (IMU) 132 may provide the sampled measurement signals to the portable controller device 110, which may determine the fast calibration data.

The eye tracking unit 130 may include one or more eye tracking systems. As used herein, "eye tracking" may refer to determining an eye's position or relative position, including orientation, location, and/or gaze of a user's eye. In some examples, an eye tracking system may include an imaging system that captures one or more images of an eye and may optionally include a light emitter, which may generate light (e.g., a fringe pattern) that is directed to an eye such that light reflected by the eye may be captured by the imaging system (e.g., a camera). In other examples, the eye tracking unit 130 may capture reflected radio waves emitted by a miniature radar unit. These data associated with the eye may be used to determine or predict eye position, orientation, movement, location, and/or gaze.

In some examples, the near-eye display 120 may use the orientation of the eye to introduce depth cues (e.g., blur image outside of the user's main line of sight), collect heuristics on the user interaction in the virtual reality (VR) media (e.g., time spent on any particular subject, object, or frame as a function of exposed stimuli), some other functions that are based in part on the orientation of at least one of the user's eyes, or any combination thereof. In some examples, because the orientation may be determined for both eyes of the user, the eye tracking unit 130 may be able to determine where the user is looking or predict any user patterns, etc.

In some examples, the input/output interface 140 may be a device that allows a user to send action requests to the portable controller device 110. As used herein, an "action request" may be a request to perform a particular action. For example, an action request may be to start or to end an application or to perform a particular action within the application. The input/output interface 140 may include one or more input devices. Example input devices may include a keyboard, a mouse, a game controller, a glove, a button, a touch screen, or any other suitable device for receiving action requests and communicating the received action requests to the portable controller device 110. In some examples, an action request received by the input/output interface 140 may be communicated to the portable controller device 110, which may perform an action corresponding to the requested action.

In some examples, the portable controller device 110 may provide content to the near-eye display 120 for presentation to the user in accordance with information received from one or more of external imaging device 150, the near-eye display 120, and the input/output interface 140. For example, in the example shown in FIG. 1, the portable controller device 110 may include an application store 112, a headset tracking module 114, a virtual reality engine 116, and an eye tracking module 118. Some examples of the portable controller device 110 may include different or additional modules than those described in conjunction with FIG. 1. Functions further described below may be distributed among components of the portable controller device 110 in a different manner than is described here.

In some examples, the portable controller device 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In some examples, the modules of the portable controller device 110 described in conjunction with FIG. 1 may be encoded as instructions in the non-transitory computer-readable storage medium that, when executed by the processor, cause the processor to perform the functions further described below. It should be appreciated that the portable controller device 110 may or may not be needed or the portable controller device 110 may be integrated with or separate from the near-eye display 120.

In some examples, the application store 112 may store one or more applications for execution by the portable controller device 110. An application may include a group of instructions that, when executed by a processor, generates content for presentation to the user. Examples of the applications may include gaming applications, conferencing applications, video playback application, or other suitable applications.

In some examples, the headset tracking module 114 may track movements of the near-eye display 120 using slow calibration information from the external imaging device 150. For example, the headset tracking module 114 may determine positions of a reference point of the near-eye display 120 using observed locators from the slow calibration information and a model of the near-eye display 120. Additionally, in some examples, the headset tracking module 114 may use portions of the fast calibration information, the slow calibration information, or any combination thereof, to predict a future location of the near-eye display 120. In some examples, the headset tracking module 114 may provide the estimated or predicted future position of the near-eye display 120 to the virtual reality engine 116.

In some examples, the virtual reality engine 116 may execute applications within the artificial reality system environment 100 and receive position information of the near-eye display 120, acceleration information of the near-eye display 120, velocity information of the near-eye display 120, predicted future positions of the near-eye display 120, or any combination thereof from the headset tracking module 114. In some examples, the virtual reality engine 116 may also receive estimated eye position and orientation information from the eye tracking module 118. Based on the received information, the virtual reality engine 116 may determine content to provide to the near-eye display 120 for presentation to the user.

In some examples, the eye tracking module 118, which may be implemented as a processor, may receive eye tracking data from the eye tracking unit 130 and determine the position of the user's eye based on the eye tracking data. In some examples, the position of the eye may include an eye's orientation, location, or both relative to the near-eye display 120 or any element thereof. So, in these examples, because the eye's axes of rotation change as a function of the eye's location in its socket, determining the eye's location in its socket may allow the eye tracking module 118 to more accurately determine the eye's orientation.

In some examples, a location of a projector of a display system may be adjusted to enable any number of design modifications. For example, in some instances, a projector may be located in front of a viewer's eye (i.e., "front-mounted" placement). In a front-mounted placement, in some examples, a projector of a display system may be located away from a user's eyes (i.e., "world-side"). In some examples, a head-mounted display (HMD) device may utilize a front-mounted placement to propagate light towards a user's eye(s) to project an image.

Figure 2:
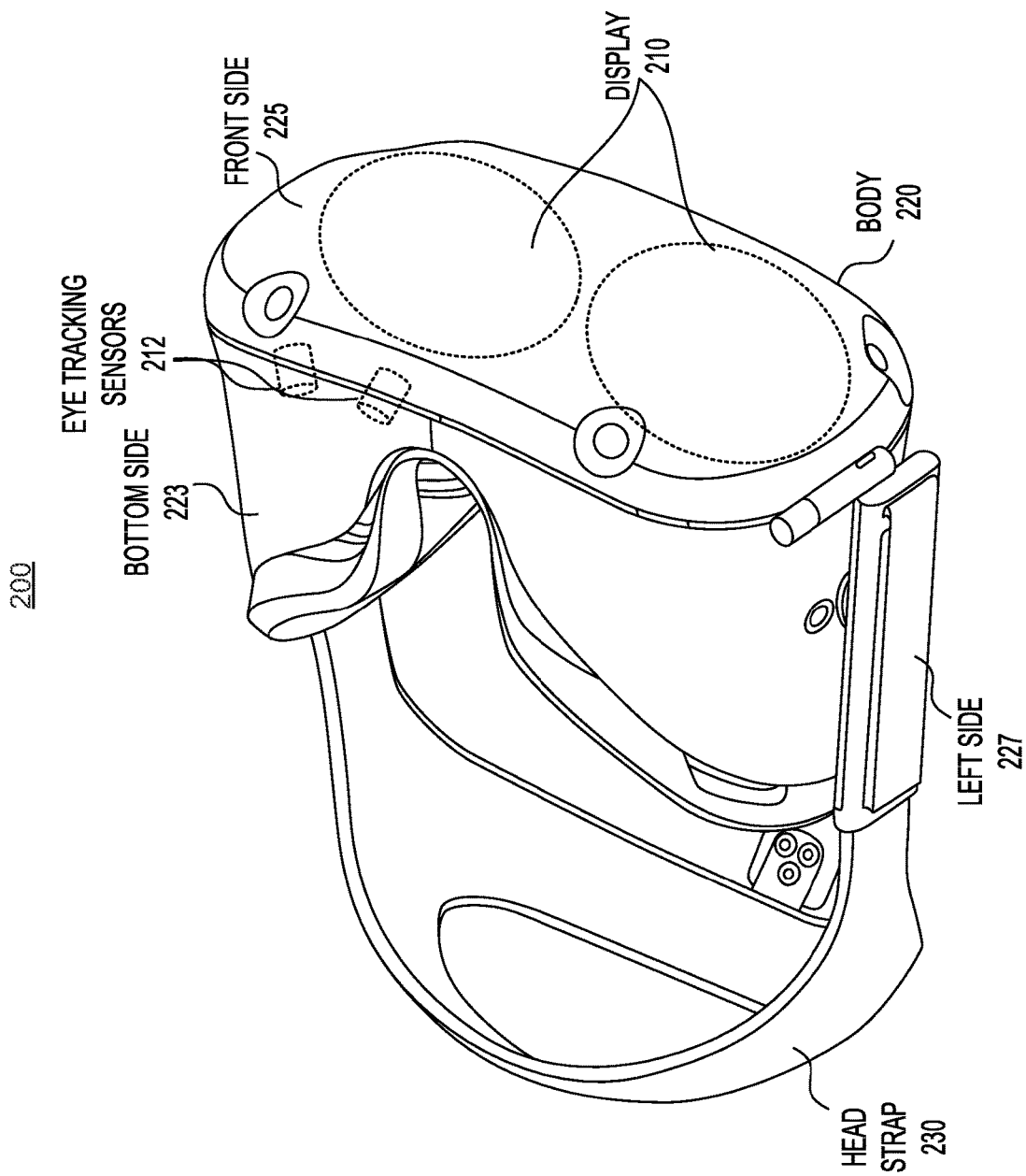
FIG. 2 illustrates a perspective view of a near-eye display in the form of a head-mounted display (HMD) device, according to an example.

FIG. 2 illustrates a perspective view of a near-eye display in the form of a head-mounted display (HMD) device 200, according to an example. In some examples, the head-mounted device (HMD) device 200 may be a part of a virtual reality (VR) system, an augmented reality (AR) system, a mixed reality (MR) system, another system that uses displays or wearables, or any combination thereof. In some examples, the head-mounted display (HMD) device 200 may include a body 220 and a head strap 230. FIG. 2 shows a bottom side 223, a front side 225, and a left side 227 of the body 220 in the perspective view. In some examples, the head strap 230 may have an adjustable or extendible length. In particular, in some examples, there may be a sufficient space between the body 220 and the head strap 230 of the head-mounted display (HMD) device 200 for allowing a user to mount the head-mounted display (HMD) device 200 onto the user's head. For example, the length of the head strap 230 may be adjustable to accommodate a range of user head sizes. In some examples, the head-mounted display (HMD) device 200 may include additional, fewer, and/or different components.

In some examples, the head-mounted display (HMD) device 200 may present, to a user, media or other digital content including virtual and/or augmented views of a physical, real-world environment with computer-generated elements. Examples of the media or digital content presented by the head-mounted display (HMD) device 200 may include images (e.g., two-dimensional (2D) or three-dimensional (3D) images), videos (e.g., 2D or 3D videos), audio, or any combination thereof. In some examples, the images and videos may be presented to each eye of a user by one or more display assemblies (not shown in FIG. 2) enclosed in the body 220 of the head-mounted display (HMD) device 200.

In some examples, the head-mounted display (HMD) device 200 may include various sensors (not shown), such as depth sensors, motion sensors, position sensors, and/or eye tracking sensors. Some of these sensors may use any number of structured or unstructured light patterns for sensing purposes. In some examples, the head-mounted display (HMD) device 200 may include an input/output interface 140 for communicating with a portable controller device 110, as described with respect to FIG. 1. In some examples, the head-mounted display (HMD) device 200 may include a virtual reality engine (not shown), but similar to the virtual reality engine 116 described with respect to FIG. 1, that may execute applications within the head-mounted display (HMD) device 200 and receive depth information, position information, acceleration information, velocity information, predicted future positions, or any combination thereof of the head-mounted display (HMD) device 200 from the various sensors.

In some examples, the information received by the virtual reality engine 116 may be used for producing a signal (e.g., display instructions) to the one or more display assemblies. In some examples, the head-mounted display (HMD) device 200 may include locators (not shown), but similar to the locators 126 described in FIG. 1, which may be located in fixed positions on the body 220 of the head-mounted display (HMD) device 200 relative to one another and relative to a reference point. Each of the locators may emit light that is detectable by an external imaging device. This may be useful for the purposes of head tracking or other movement/orientation. It should be appreciated that other elements or components may also be used in addition or in lieu of such locators.

It should be appreciated that in some examples, a projector mounted in a display system may be placed near and/or closer to a user's eye (i.e., "eye-side"). In some examples, and as discussed herein, a projector for a display system shaped liked eyeglasses may be mounted or positioned in a temple arm (i.e., a top far corner of a lens side) of the eyeglasses. It should be appreciated that, in some instances, utilizing a back-mounted projector placement may help to reduce size or bulkiness of any required housing required for a display system, which may also result in a significant improvement in user experience for a user.

In some examples, the projector may provide augmented reality (AR)/virtual reality (VR) content based on one or more objects provided by one or more applications (e.g., from the application store 112 in the portable controller device 110 of FIG. 1). The portable controller device 110 may generate/re-interpret a superframe comprising the objects. Through the superframe based presentation of the content, objects may remain stationary or move as needed depending on a movement of the head or a gaze of a user rendering the presented content more realistic.

Figure 3:
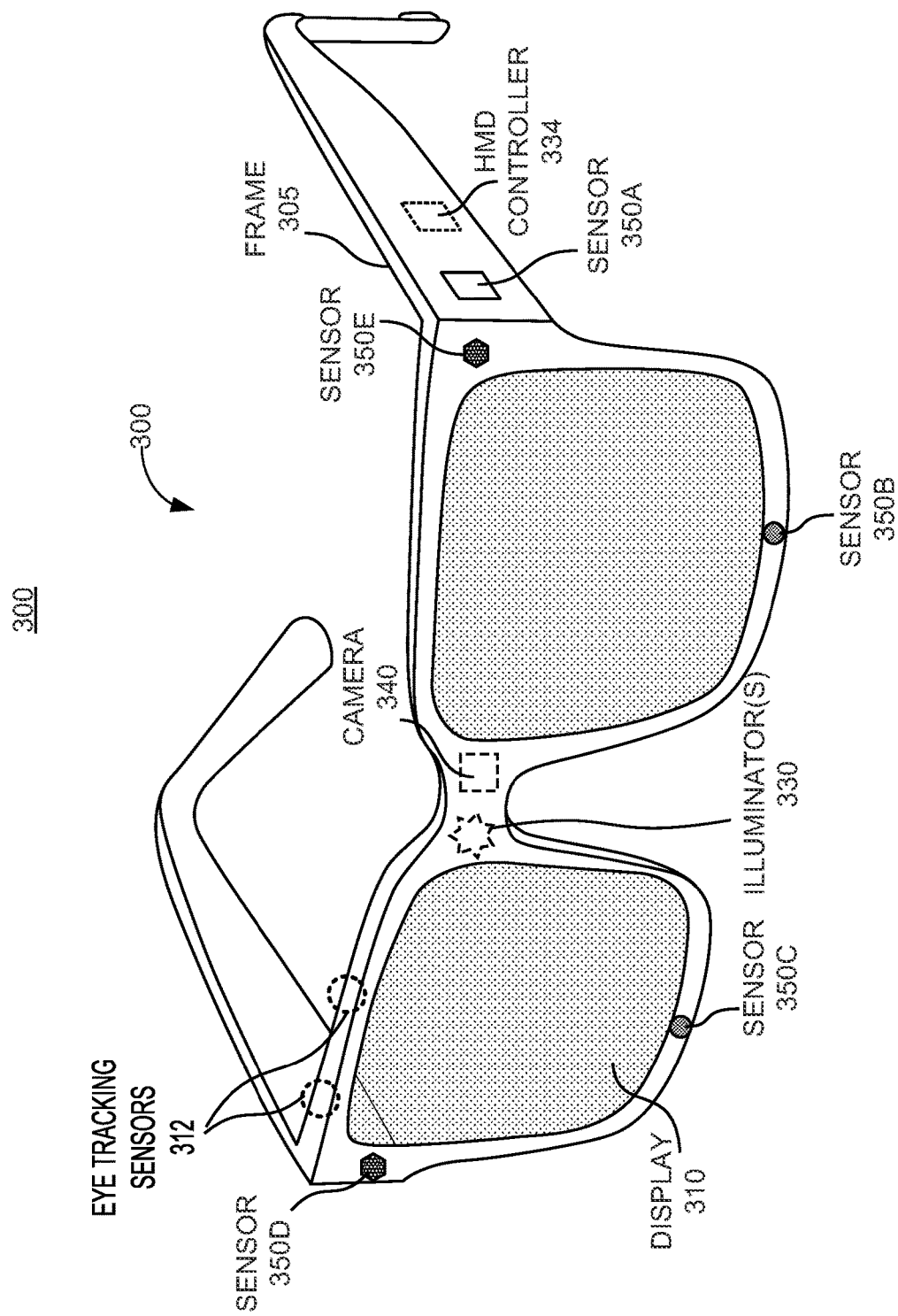
FIG. 3 illustrates a perspective view of a near-eye display in the form of a pair of glasses, according to an example.

FIG. 3 is a perspective view of a near-eye display 300 in the form of a pair of glasses (or other similar eyewear), according to an example. In some examples, the near-eye display 300 may be a specific example of near-eye display 120 of FIG. 1 and may be configured to operate as a virtual reality display, an augmented reality (AR) display, and/or a mixed reality (MR) display.

In some examples, the near-eye display 300 may include a frame 305 and a display 310. In some examples, the display 310 may be configured to present media or other content to a user. In some examples, the display 310 may include display electronics and/or display optics, similar to components described with respect to FIGS. 1-2. For example, as described above with respect to the near-eye display 120 of FIG. 1, the display 310 may include a liquid crystal display (LCD) display panel, a light-emitting diode (LED) display panel, or an optical display panel (e.g., a waveguide display assembly). In some examples, the display 310 may also include any number of optical components, such as waveguides, gratings, lenses, mirrors, etc. In other examples, the display 210 may include a projector, or in place of the display 310 the near-eye display 300 may include a projector.

In some examples, the near-eye display 300 may further include various sensors 350a, 350b, 350c, 350d, and 350e on or within a frame 305. In some examples, the various sensors 350a-350e may include any number of depth sensors, motion sensors, position sensors, inertial sensors, and/or ambient light sensors, as shown. In some examples, the various sensors 350a-350e may include any number of image sensors configured to generate image data representing different fields of views in one or more different directions. In some examples, the various sensors 350a-350e may be used as input devices to control or influence the displayed content of the near-eye display, and/or to provide an interactive virtual reality (VR), augmented reality (AR), and/or mixed reality (MR) experience to a user of the near-eye display 300. In some examples, the various sensors 350a-350e may also be used for stereoscopic imaging or other similar application.

In some examples, the near-eye display 300 may further include one or more illuminators 330 to project light into a physical environment. The projected light may be associated with different frequency bands (e.g., visible light, infra-red light, ultra-violet light, etc.), and may serve various purposes. In some examples, the one or more illuminator(s) 330 may be used as locators, such as the one or more locators 126 described above with respect to FIGS. 1-2.

In some examples, the near-eye display 300 may also include a camera 340 or other image capture unit. The camera 340, for instance, may capture images of the physical environment in the field of view. In some instances, the captured images may be processed, for example, by a virtual reality engine (e.g., the virtual reality engine 116 of FIG. 1) to add virtual objects to the captured images or modify physical objects in the captured images, and the processed images may be displayed to the user by the display 310 for augmented reality (AR) and/or mixed reality (MR) applications. The near-eye display 300 may also include eye tracking sensors 312. A head-mounted display (HMD) controller 334 may be a processor on the near-eye display device 300 to receive superframes from the portable controller device 110 and provide video signal to display driver(s) on the near-eye display device 300.

Figure 4:
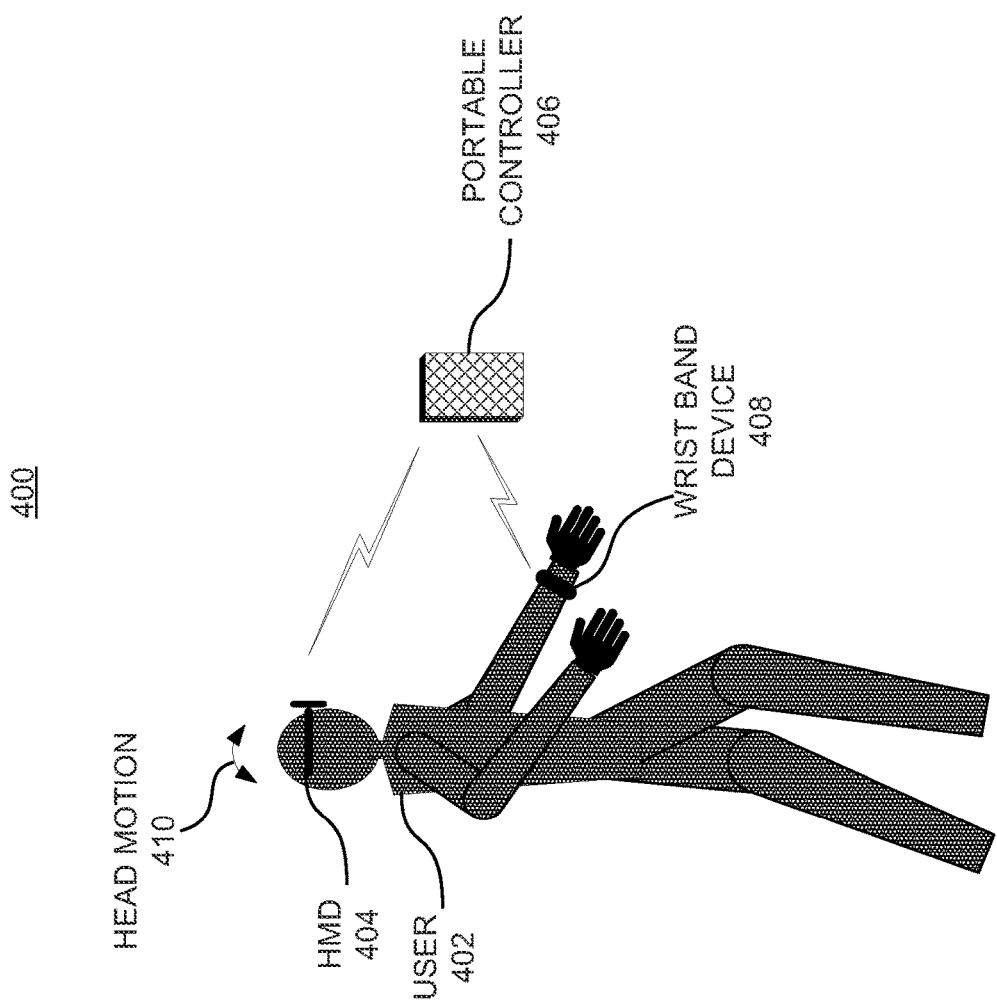
FIG. 4 illustrates devices of a system for displaying virtual reality (VR)/augmented reality (AR) content on near-eye display devices, according to examples.

FIG. 4 illustrates devices of a system for displaying virtual reality (VR)/augmented reality (AR) content on near-eye display devices, according to examples. Diagram 400 shows a user 402 wearing a near-eye display device 404 (HMD) and a wrist band device 408. A portable controller device 406 may be the third component of the augmented reality (AR)/virtual reality (VR) display system along with the near-eye display device 404 and the wrist band device 408 to display augmented reality (AR)/virtual reality (VR) using superframes. The near-eye display device 404 may, in some examples, respond to or react to head motion 410 of the user and change displayed content.

In some examples, a hardware (HW) architecture of the system may employ a system-on-chip (SoC) and a coprocessor to compose and submit textures. The coprocessor may compose and submit textures by using display serial interface (DSI) display lines to transmit the textures to a physical display of the near-eye display device 404. Main levels may include an applications level using the surface rendered by the applications, a superframe composer level providing an abstraction layer on top of a surface flinger (SL) application programming interface (API) and allowing assignment of textures and metadata to different hardware planes, and an SL API+HW composer (HC) level routing surfaces to hardware.

In some examples, a system for implementing an augmented reality (AR)/virtual reality (VR) display software architecture may include a stack display software architecture of three levels: an application level; a display service level; and a driver level. The application level may include a user visible application that uses the graphical processing unit (GPU) or user interface (UI) for rendering its content (e.g., a frame or superframe). The system may use the surfaces or enhanced effects that are rendered by the applications or the compositor, depending on the type of the application, and compute the metadata related to the location or coordinates. The display service level may provide the assignment of textures and their coordinates. The system may also include a surface flinger (SL) level, which is a framework level component, that allows for building surface queues and display configurations for presentation. The system may include a driver level for implementing the display (e.g., a display processing unit (DPU) driver).

Figure 5:
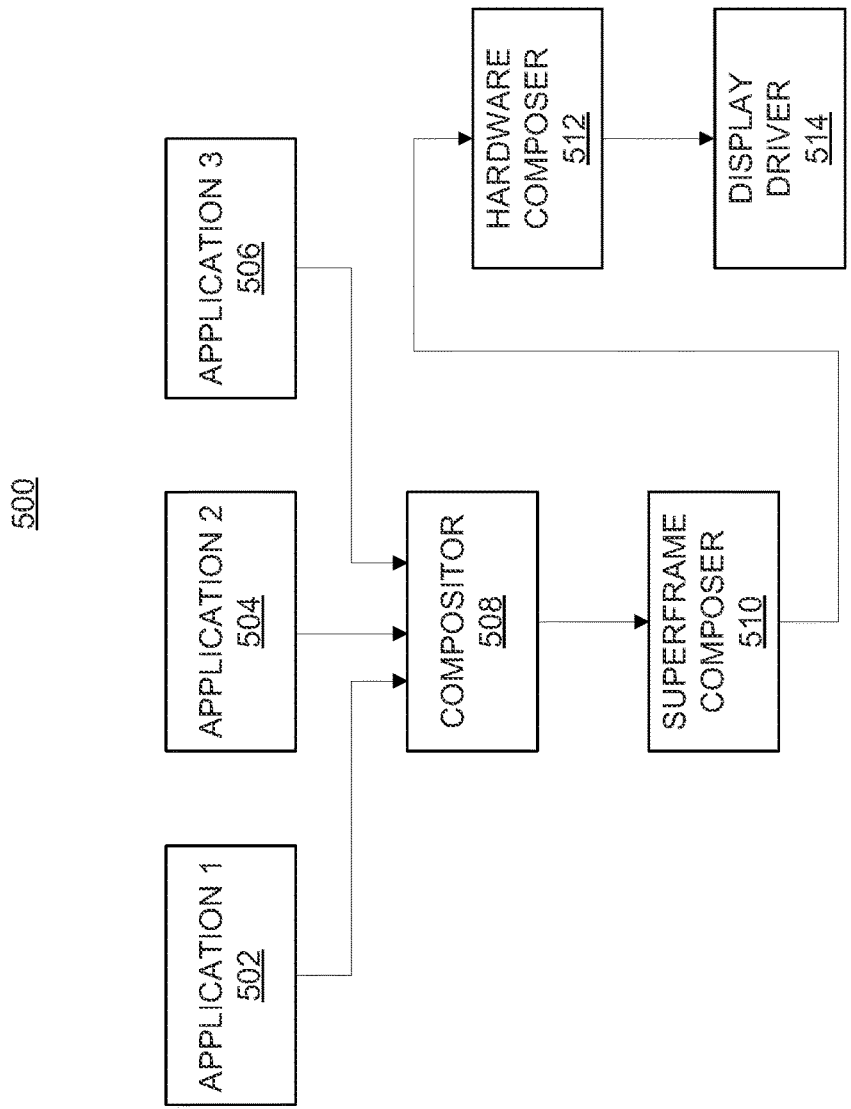
FIG. 5 illustrates major components of a system for displaying virtual reality (VR)/augmented reality (AR) content on near-eye display devices, according to examples.

FIG. 5 illustrates major components of a system for displaying virtual reality (VR)/augmented reality (AR) content on near-eye display devices, according to examples. Diagram 500 shows applications 1, 2, and 3 502, 504, 506 representing any number of applications that may provide content to be displayed on a near-eye display device. The system also includes a compositor 508, a superframe composer 510, a hardware composer 512, and a display driver 514.

As mentioned herein, the system for displaying virtual reality (VR)/augmented reality (AR) content on near-eye display devices may include a hardware (HW) architecture that employs a system-on-chip (SoC) to compose and submit textures. A software (SW) architecture of the system may be a stack display architecture and include an applications level using the surface rendered by the applications 1, 2, and 3 502, 504, 506, a display service level to compose superframes, provide an abstraction layer on top of a surface flinger (SL) application programming interface (API), and allow assignment of textures and metadata to different hardware planes, and a driver level.

In some examples, near-eye display devices are designed to allow users see through the real world while experiencing elements of metaverse offering a rich remote presence experience that connect people. The system architecture supports immersive virtual reality and mixed reality headsets. A runtime service may initialize a surface flinger and take control of presentation on the display. This may be accomplished by initializing the surface flinger in a single plane configuration where all the rendered surfaces are composited by the compositor 508.

The virtual reality (VR) Shell may be the first application to start after the system boots up and may provide a system user interface and an initial set of screens that allow the user to launch an application. Each application (any one of the applications 1, 2, and 3 502, 504, 506) may see its own virtual display, which it may use as its own render target. When the application containing user interface elements submits a frame, the frame is composited by the compositor 508. If the application is rendering on its own, for example, in case of a game, the application may render its own surfaces and the compositor may be mostly passthrough. In some examples, the frames may then be submitted as layers to a time warp scheduler in the virtual reality (VR) runtime. The time warp scheduler may combine the multiple layers based on their geometry in the 3D space and render them to a 2D surface that is going to be presented by the display.

In some examples, the virtual reality (VR)/augmented reality (AR) display system may have a three-part hardware (HW) architecture. The first part may be the portable controller device, a small mobile device that houses the system-on-chip (SoC) and may be responsible for running the virtual reality operating system (VROS). The portable controller device may also contain a coprocessor that provides re-interpretation and compression of textures received over display serial interface (DSI) and transmits them over wireless means to a processor on the near-eye display device. The second part may be the near-eye display device including see through optical lenses with optical waveguides. These may be connected to display drivers and the on-board processor that is responsible for receiving data from coprocessor of the portable controller device over wireless means. The on-board processor may be responsible for decompressing the textures received and retargeting them for the respective display. A wrist band device may be used for providing input, hand tracking, and gestures for the Orion virtual reality (VR)/augmented reality (AR) display system.

The display subsystem as described in the diagram 500 above may be executed on the system-on-chip (SoC), which is part of the portable controller device. While a display in a conventional virtual reality (VR) system is directly driven by and is connected to the system-on-chip (SoC), a virtual reality (VR)/augmented reality (AR) display system according to examples may use the display serial interface (DSI) stream as a transport of high bandwidth data between the system-on-chip (SoC) and the coprocessor on the portable controller device.

Figure 6:
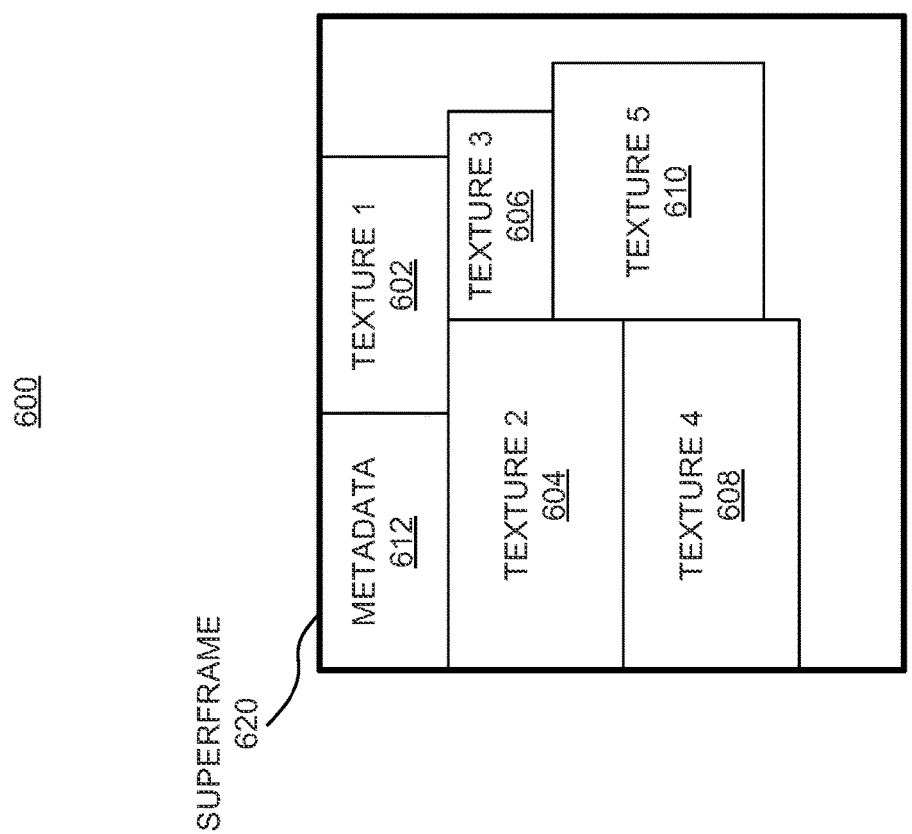
FIG. 6 illustrates a superframe and contents, according to examples.

FIG. 6 illustrates a superframe and contents, according to examples. Diagram 600 shows superframe 620 with metadata 612, texture 1 602, texture 2 604, texture 3 606, texture 4 608, and texture 5 610. As mentioned herein, displayed content in a virtual reality (VR)/augmented reality (AR) display system may include objects from a variety of applications. For example, one application may provide one or more appliances, another may provide one or more furniture, and a further application may provide background (e.g., walls, doors, etc.) for a virtual view of a room. The objects may be converted to tiles (textures including surface characteristics such as lay, roughness, waviness, etc.) at the system-on-chip (SoC) or the coprocessor on the portable controller device. The textures may be mutually exclusive, that is, each texture is stored as a different object in memory. In the displayed content, the textures may overlap.

Thus, a superframe as described herein may include mutually exclusive tiles laid out on a 2D display surface that include a set of textures and one tile describing metadata for these textures. The superframe is the output 2D surface that is transmitted over the display serial interface (DSI) lines to the coprocessor at the portable controller device. Hence, the coprocessor essentially acts as a panel with its own panel configuration when looked at from the perspective of the system-on-chip (SoC).

Figure 7:
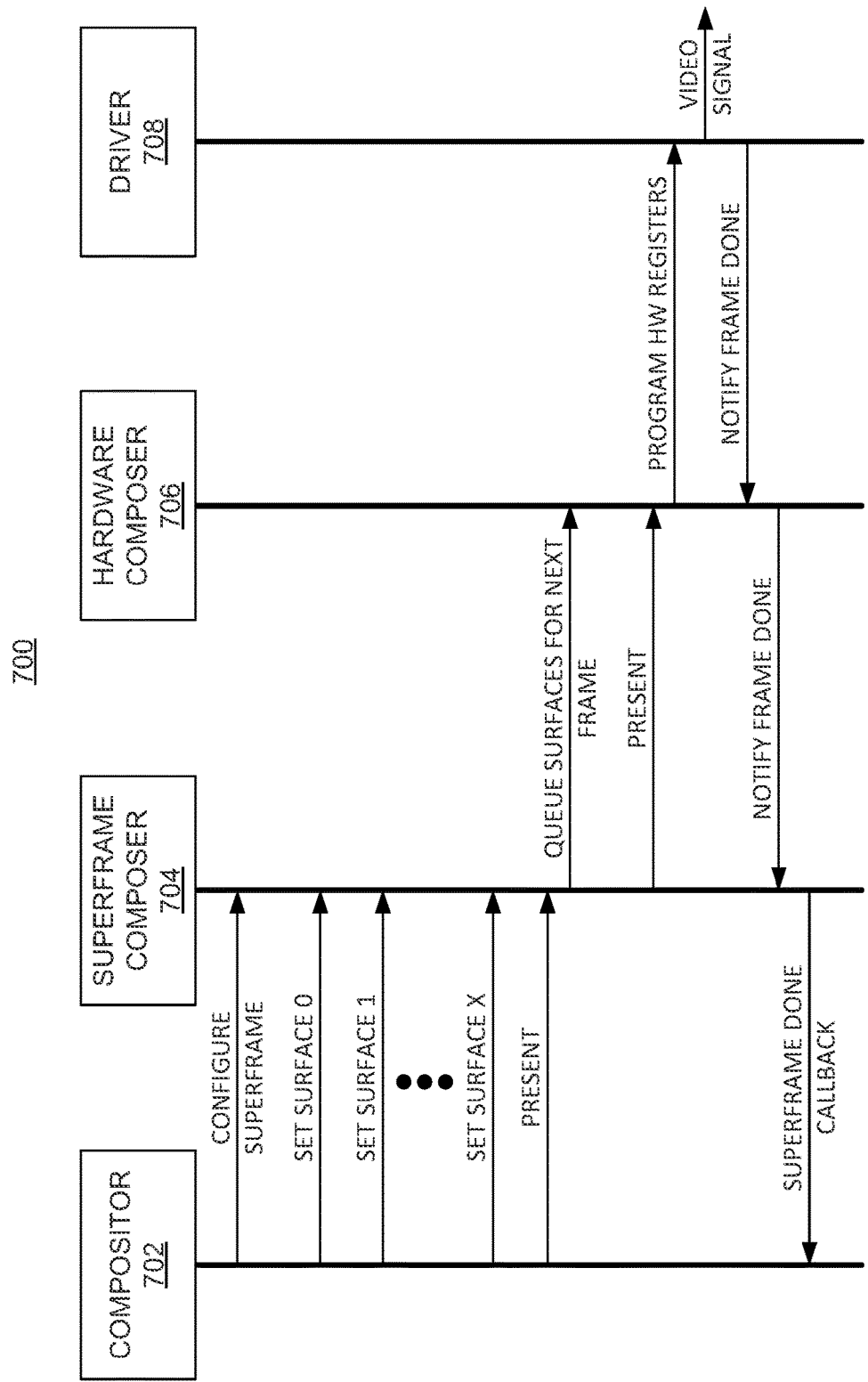
FIG. 7 illustrates interactions between major components of a system for displaying virtual reality (VR)/augmented reality (AR) content on near-eye display devices, according to examples.

FIG. 7 illustrates interactions between major components of a system for displaying virtual reality (VR)/augmented reality (AR) content on near-eye display devices, according to examples. Diagram 700 shows interactions to display virtual reality (VR)/augmented reality (AR) content between a compositor 702, a superframe composer 704, a hardware (HW) composer 706, and a driver 708.

In some examples, when the portable controller device boots up, the operating system boot process may initialize the display service. The display service may be the only one that sends the surfaces to the display, and the rest of the software (SW) stack may not be able to instantiate the physical display. That means when display service is active, VRRuntime and AOSP windowmanager may not start. AR Shell may be the initial application that starts up after the system startup and may use the compositor to render the system user interface (UI). AR Shell may also be responsible for initiating the launch of all other applications on the system. Similar to the AR shell, all applications may either use the compositor to render their buffers or use application programming interfaces (APIs) to directly render the textures and submit these to the compositor. Compositor may be passthrough for the applications that render the entire surface themselves.

These textures/layers may then be submitted to an application programming interface (API) responsible for arbitrating between multiple sources of textures and sending to the superframe composer. The application programming interface (API) or upper layers may manage triple buffering between incoming buffers to ensure the ones on the screen are not modified. The application programming interface (API) may also be responsible for computing the metadata header, which may contain the positions, dimensions, and other metadata for the incoming textures. This header may be assigned one of the layers in the superframe composer. The application programming interface (API) may communicate with superframe composer using the operating system (OS) software development kit (SDK). This operating system (OS) software development kit (SDK) component may communicate using binder with superframe composer system service running as part of the display services. The superframe composer may abstract the underlying hardware (HW) from the software (SW) components. The number of layers may be equal to the number of planes in the hardware (HW). The number of textures, which clients (applications) can send through, may be one less than the number of planes. The superframe composer may use the surface flinger (SL) to manage the buffer queues. The superframe composer may program the surfaces in the hardware (HW) composer in such a way that the flow bypasses all graphical processing unit (GPU) composition code paths and use the display processing unit (DPU) hardware (HW) composition directly.

When superframe composer submits buffers via the surface flinger (SL) to hardware (HW) composer HAL, the surfaces may be routed to an implementation of the hardware (HW) composer. Through the structure discussed herein, in-memory composition may be prevented, and any additional memory copies of the rendered texture may be avoided. The hardware (HW) composed 2D surface may then be transferred over display serial interface (DSI) to the coprocessor in the portable controller device. The coprocessor in the portable controller device may be a graphics coprocessor which may be configured over PCIE and receive texture data over the display serial interface (DSI) due to high bandwidth requirements. Once the textures are received over the display serial interface (DSI), they may be compressed using a codec (e.g., HVEC) and transmitted over wireless means to the on-board processor on the near-eye display device. On the near-eye display device end, the on-board processor may receive the buffer and decompress it back into textures. The on-board processor may then program the driver(s) to display these decoded buffers at right world locked coordinates as per the metadata.

In some examples, the display processing unit (DPU) may drive the display in video mode. In the video mode, the display serial interface (DSI) master of the system-on-chip (SOC) may be responsible for generating synchronization (vsync) signals as part of the display serial interface (DSI) stream. Once the superframe is completely transmitted, the display processing unit (DPU) may raise a vsync/frame_done interrupt. This signal may be routed to the hardware (HW) composer abstraction layer. The hardware (HW) composer may then send this signal as a call back to the surface flinger (SL), which in turn may pass ot on to the superframe composer. The superframe composer may validate whether the last sent frame has already been signaled. The superframe composer may pass the display serial interface (DSI) vsync to the application programming interface (API). During the frame presentation lifecycle, the application programming interface (API) may program a new superframe in the superframe composer, however it may ensure that the previously programmed surfaces are not released or reused until vsync for the frame is received. Once the vsync is received the application programming interface (API) may signal the compositor/application layer clients that the surface can be reused.

Figure 8:
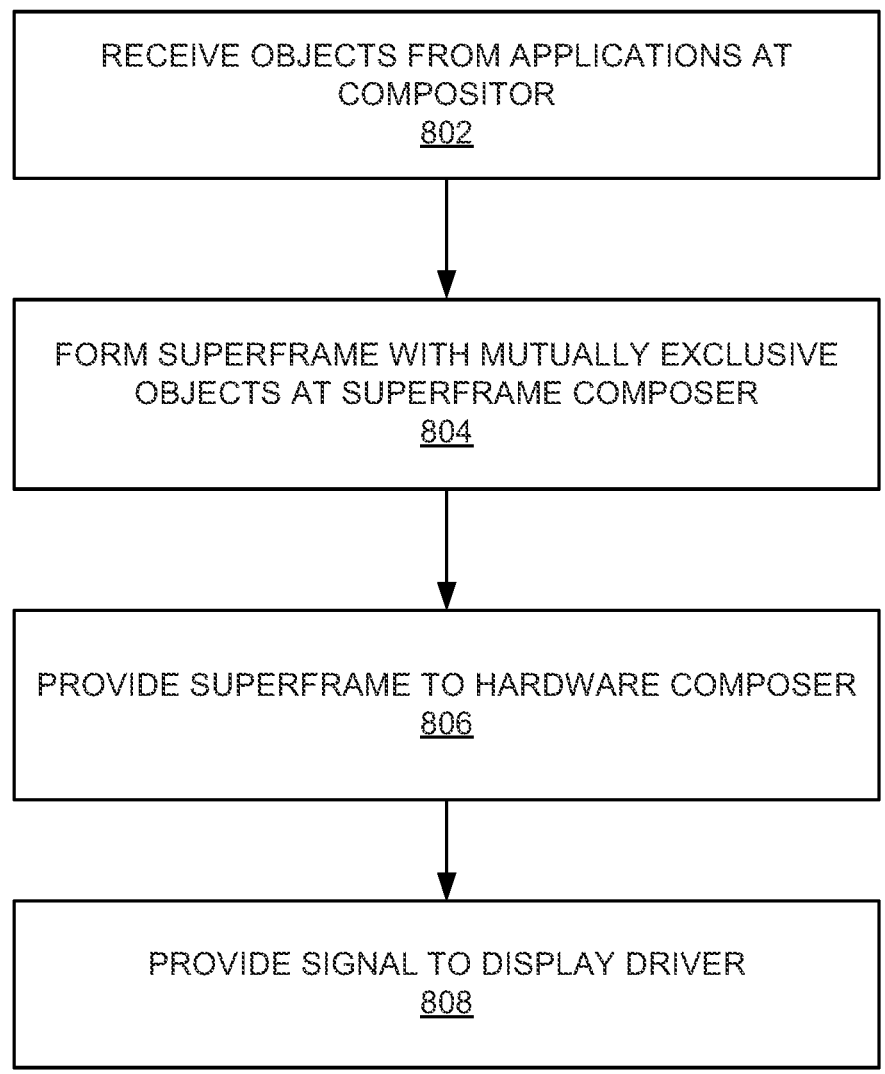
FIG. 8 illustrates a flow diagram for a method of displaying virtual reality (VR)/augmented reality (AR) content on near-eye display devices, according to examples, according to some examples.

FIG. 8 illustrates a flow diagram for a method of displaying virtual reality (VR)/augmented reality (AR) content on near-eye display devices, according to examples, according to some examples. The method 800 is provided by way of example, as there may be a variety of ways to carry out the method described herein. Although the method 800 is primarily described as being performed by the components of FIGS. 5 and 7, the method 800 may be executed or otherwise performed by one or more processing components of another system or a combination of systems. Each block shown in FIG. 8 may further represent one or more processes, methods, or subroutines, and one or more of the blocks (e.g., the selection process) may include machine readable instructions stored on a non-transitory computer readable medium and executed by a processor or other type of processing circuit to perform one or more operations described herein.

At block 802, one or more objects to be included in the virtual reality (VR)/augmented reality (AR) content may be received from one or more applications at a compositor. The objects may be processed into mutually exclusive textures (tiles on the displayed content). The compositor may also compute metadata related to location or coordinates for the objects. The compositor may be passthrough for applications that render the entire surface themselves.

At block 804, a superframe composed of the tiles containing the textures (and a metadata tile) may be formed by a superframe composer. The compositor may provide a metadata header which contains the positions, dimensions and other metadata for the textures to the superframe composer along with the textures.

At block 806, the superframe composer may provide the superframe to a hardware composer. The superframe composer may submit buffers via surface flinger to the hardware (HW) composer abstraction layer using display serial interface (DSI).

At block 808, the hardware composer may provide a video signal based on the superframe to one or more display drivers. In some examples, the hardware composer may send a synchronization signal as a call back to the surface flinger, which in turn may pass the signal on to the superframe composer. The superframe composer may validate whether the last sent frame has already been signaled.

According to examples, a method of making a near-eye display device to provide virtual reality (VR)/augmented reality (AR) content using superframes is described herein. A system of making the near-eye display device is also described herein. A non-transitory computer-readable storage medium may have an executable stored thereon, which when executed instructs a processor to perform the methods described herein.

In the foregoing description, various examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example' is not necessarily to be construed as preferred or advantageous over other embodiments or designs.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

The invention claimed is:

1. A portable controller device comprising:
   a processor; and
   memory including executable instructions that, when executed by the processor, cause the processor to:
   responsive to receiving user launch requests, launch first and second applications;
   receive first image data from the first application and second image data from the second application, wherein the first image data is pre-rendered into a first texture, and the second image data is not pre-rendered;
   determine whether the first and second image data is pre-rendered;
   responsive to determining the first image data is pre-rendered, forgo converting the first image data into the first textures;
   responsive to determining the second image data is not pre-rendered, convert the second image data into a second texture;
   generate a superframe comprising the first and second textures and metadata comprising a first position and first dimension for the first textures and a second position and second dimension for the second texture; and
   provide the superframe to a near-eye display device configured to (i) receive the superframe and (ii) display the first and second textures in accordance with the metadata.

2. The portable controller device of claim 1, wherein the instructions, when executed by the processor, further cause the processor to:
   receive user inputs from a wrist band device, wherein the user inputs comprise hand tracking inputs, gesture detection inputs, and direct inputs; and
   adjust the first texture, the second texture, or the metadata based on the user inputs.

3. The portable controller device of claim 1, wherein providing the superframe to the near-eye display device comprises transmitting the superframe via wireless communication.

4. The portable controller device of claim 1, wherein the instructions, when executed by the processor, further cause the processor to generate the metadata based on one or more of a user head position, a user head movement, and a user gaze.

5. The portable controller device of claim 1, wherein the instructions, when executed by the processor, further cause the processor to execute a display service to (i) assign the first or second textures and the metadata to a hardware plane, and (ii) provide the superframe in form of a buffer to a hardware composer.

6. The portable controller device of claim 5, wherein the display service provides the superframe to the hardware composer through a surface flinger component application programming interface (API).

7. The portable controller device of claim 6, wherein the display service further coordinates synchronization of superframe queues.

8. The portable controller device of claim 7, wherein the instructions, when executed by the processor, further cause the processor to receive a synchronization signal from the near-eye display device for coordinating the superframe queues.

9. The portable controller device of claim 1, wherein the near-eye display device is further configured to present at least one of virtual reality (VR) or augmented reality (AR) content to a user.

10. The portable controller device of claim 1, wherein the first and second textures in the superframe are mutually exclusive such that the first texture is stored as a first object in memory and the second texture is stored as a second, separate object in the memory.

11. A computer-implemented method, comprising, at a processor of a portable controller device:
    responsive to receiving user launch requests, launching first and second applications;
    receiving first image data from the first application and second image data from the second application, wherein the first image data is pre-rendered into a first texture, and the second image data is not pre-rendered;
    responsive to determining that the first image data is pre-rendered, forgoing converting the first image data into the first texture;
    responsive to determining the second image data is not pre-rendered, converting the second image data into a second texture;
    generating a superframe comprising the first and second textures and metadata comprising a first position and first dimension for the first texture and a second position and second dimension for the second texture;
    providing the superframe to a near-eye display device configured to (i) receive the superframe and (ii) display the first and second textures in accordance with the metadata.

12. The computer-implemented method of claim 11, wherein providing the superframe to the near-eye display device comprises transmitting the superframe via wireless communication.

13. The computer-implemented method of claim 11, further comprising generating the metadata based on one or more of a user head position, a user head movement, and a user gaze.

14. The computer-implemented method of claim 11, wherein providing the superframe to the near-eye display device comprising transmitting the superframe over display serial interface (DSI) lines.

15. The computer-implemented method of claim 14, wherein the near-eye display device displaying the first and second textures comprises displaying the first and second textures on a two-dimensional (2D) surface.

16. The computer-implemented method of claim 11, wherein the first and second textures in the superframe are mutually exclusive such that the first texture is stored as a first object in memory and the second texture is stored as a second, separate object in the memory.

17. A non-transitory computer-readable storage medium having an executable stored thereon, which, when executed by a processor of a portable controller device, causes the processor to:
    responsive to receiving user launch requests, launch first and second applications;
    receive first image data from the first application and second image data from the second application, wherein the first image data is pre-rendered into a first texture, and the second image data is not pre-rendered;
    responsive to determining that the first image data is pre-rendered, forgoing converting the first image data into the first textures;
    responsive to determining the second image data is not pre-rendered, converting the second image data into a second texture;
    generate a superframe comprising the first and second textures and metadata comprising a first position and first dimension for the first textures and a second position and second dimension for the second texture;
    provide the superframe to a near-eye display device configured to (i) receive the superframe and (ii) display the first and second textures in accordance with the metadata.

18. The non-transitory computer-readable storage medium of claim 17, wherein providing the superframe to the near-eye display device comprises transmitting the superframe via wireless communication.

19. The non-transitory computer-readable storage medium of claim 17, wherein the executable further causes the processor to generate the metadata based on one or more of a user head position, a user head movement, and a user gaze.

20. The non-transitory computer-readable storage medium of claim 17, wherein the executable further causes the processor to assign the first and second textures and the metadata to a hardware plane.

* * * * *